United States Patent
Kraus et al.

(10) Patent No.: US 11,454,619 B2
(45) Date of Patent: *Sep. 27, 2022

(54) METHODS FOR COLORIMETRIC ENDPOINT DETECTION AND MULTIPLE ANALYTE TITRATION SYSTEMS

(71) Applicant: Ecolab USA Inc., St. Paul, MN (US)

(72) Inventors: Paul R. Kraus, Apple Valley, MN (US); John Wilhelm Bolduc, Inver Grove Heights, MN (US); Robert J. Ryther, St. Paul, MN (US)

(73) Assignee: Ecolab USA Inc., St. Paul, MN (US)

( * ) Notice: Subject to any disclaimer, the term of this patent is extended or adjusted under 35 U.S.C. 154(b) by 279 days.

This patent is subject to a terminal disclaimer.

(21) Appl. No.: 16/378,714

(22) Filed: Apr. 9, 2019

(65) Prior Publication Data

US 2019/0310235 A1    Oct. 10, 2019

Related U.S. Application Data

(60) Provisional application No. 62/654,715, filed on Apr. 9, 2018.

(51) Int. Cl.
*G01N 31/16* (2006.01)
*G01N 21/79* (2006.01)
*G01N 21/75* (2006.01)

(52) U.S. Cl.
CPC ........... *G01N 31/166* (2013.01); *G01N 21/79* (2013.01); *G01N 31/16* (2013.01); *G01N 2021/754* (2013.01)

(58) Field of Classification Search
CPC ............................ G01N 31/166; G01N 21/79
(Continued)

(56) References Cited

U.S. PATENT DOCUMENTS 2,977,199 A * 3/1961 Quittner ................ G01N 27/44
436/85
3,026,182 A    3/1962 Jankowski et al.
(Continued)

FOREIGN PATENT DOCUMENTS

DE    19903860 A1    8/2000
DE    19950879 A1    1/2002
(Continued)

OTHER PUBLICATIONS

Thomas, S. M. et al, Analytical Biochemistry 1989, 176, 353-359.*
(Continued)

*Primary Examiner* — Arlen Soderquist
(74) *Attorney, Agent, or Firm* — Stinson LLP

(57) ABSTRACT

Systems for quantifying one or more target analyte concentrations in a process solution are provided and can be used, for example, in methods for quantifying a target analyte concentration. These systems and methods include continuous and batchwise automated titration methods that use titration chemistries to measure the target analyte concentration in the process solution using a multiwavelength detector. The methods provide for efficient and robust automated titration methods for a variety of target analytes and can include methods that analyze more than one analyte and that provide for a dynamic range for measurement of more than one target analyte concentration.

12 Claims, 10 Drawing Sheets

(58) Field of Classification Search
USPC .................................. 422/75; 436/51, 163
See application file for complete search history.

(56) References Cited

U.S. PATENT DOCUMENTS

| | | | | |
|---|---|---|---|---|
| 3,186,799 | A * | 6/1965 | Hach | G01N 21/79 422/81 |
| 3,189,533 | A * | 6/1965 | Anscherlik | G01N 27/44 204/405 |
| 3,192,017 | A * | 6/1965 | Kruger | G01N 31/166 422/76 |
| 3,259,465 | A * | 7/1966 | Sheen | G01N 31/16 422/81 |
| 3,447,906 | A | 6/1969 | Zimmerli | |
| 3,723,062 | A * | 3/1973 | Dahms | G01N 31/221 436/51 |
| 3,899,294 | A | 8/1975 | Magiros | |
| 3,929,411 | A * | 12/1975 | Takano | G01N 35/1097 436/180 |
| 4,018,565 | A | 4/1977 | Fletcher, III et al. | |
| 4,120,657 | A | 10/1978 | Nagy et al. | |
| 4,165,218 | A * | 8/1979 | Vanhumbeeck | C25D 21/14 436/51 |
| 4,283,201 | A * | 8/1981 | DeFord | G01N 31/166 422/62 |
| 4,286,965 | A * | 9/1981 | Vanhumbeeck | C23C 18/405 118/689 |
| 4,749,552 | A * | 6/1988 | Sakisako | G01N 31/16 422/62 |
| 4,774,101 | A * | 9/1988 | Harris | C23C 18/1617 427/345 |
| 4,920,056 | A * | 4/1990 | Dasgupta | G01N 35/08 422/130 |
| 5,049,280 | A | 9/1991 | Raymond et al. | |
| 5,080,866 | A * | 1/1992 | Petty | G01N 31/166 422/110 |
| 5,104,527 | A | 4/1992 | Clinkenbeard | |
| 5,132,916 | A | 7/1992 | Gulaian et al. | |
| 5,181,082 | A | 1/1993 | Jeannotte et al. | |
| 5,186,895 | A * | 2/1993 | Onofusa | G01N 1/28 204/405 |
| 5,192,509 | A | 3/1993 | Surjaatmadja et al. | |
| 5,192,984 | A * | 3/1993 | Beecher | G01N 1/44 250/576 |
| 5,389,546 | A | 2/1995 | Becket | |
| H1479 | H * | 9/1995 | Paulonis | 422/82.01 |
| 5,484,626 | A * | 1/1996 | Storjohann | C23C 18/1617 118/26 |
| 5,721,143 | A * | 2/1998 | Smith | G01N 31/162 422/75 |
| 5,855,791 | A | 1/1999 | Hays et al. | |
| 5,924,794 | A | 7/1999 | O'Dougherty et al. | |
| 6,010,664 | A | 1/2000 | Johnson et al. | |
| 6,268,218 | B1 | 7/2001 | Pantoliano et al. | |
| 6,432,661 | B1 | 8/2002 | Heitfeld et al. | |
| 6,913,930 | B2 | 7/2005 | Bevan et al. | |
| 7,153,695 | B2 | 12/2006 | Roeraade et al. | |
| 7,214,537 | B2 | 5/2007 | Stevens et al. | |
| 7,349,760 | B2 | 3/2008 | Wei et al. | |
| 8,071,390 | B2 | 12/2011 | Tokhtuev et al. | |
| 8,076,154 | B2 | 12/2011 | Erickson et al. | |
| 8,076,155 | B2 | 12/2011 | Tokhtuev et al. | |
| 8,119,412 | B2 | 2/2012 | Kraus | |
| 8,143,070 | B2 | 3/2012 | Tokhtuev et al. | |
| 8,178,352 | B2 | 5/2012 | Tokhtuev et al. | |
| 8,236,573 | B2 | 8/2012 | Tokhtuev et al. | |
| 8,748,191 | B2 | 6/2014 | Kraus et al. | |
| 8,980,636 | B2 | 3/2015 | Bolduc et al. | |
| 9,766,183 | B2 | 9/2017 | Kraus et al. | |
| 10,150,680 | B1 * | 12/2018 | Kurani | G01N 33/18 |
| 10,379,091 | B2 | 8/2019 | Kraus et al. | |
| 2002/0151080 | A1 | 10/2002 | Dasgupta et al. | |
| 2003/0032195 | A1 | 2/2003 | Roeraade et al. | |
| 2003/0121799 | A1 * | 7/2003 | Stevens | G05D 21/02 205/775 |
| 2003/0129254 | A1 | 7/2003 | Yasuhara et al. | |
| 2003/0175983 | A1 * | 9/2003 | Wei | G01N 31/162 436/163 |
| 2004/0023405 | A1 * | 2/2004 | Bevan | G01N 31/166 436/163 |
| 2004/0048329 | A1 * | 3/2004 | Beuermann | G01N 21/75 435/28 |
| 2004/0065547 | A1 * | 4/2004 | Stevens | H01L 21/67253 204/405 |
| 2005/0013740 | A1 * | 1/2005 | Mason | G01N 21/79 422/68.1 |
| 2005/0221514 | A1 | 10/2005 | Pasadyn et al. | |
| 2006/0172427 | A1 | 8/2006 | Germouni et al. | |
| 2006/0210961 | A1 | 9/2006 | Magnaldo et al. | |
| 2007/0138401 | A1 * | 6/2007 | Tokhtuev | G01J 3/36 250/373 |
| 2007/0231910 | A1 * | 10/2007 | DeGrandpre | G01N 31/22 436/56 |
| 2008/0305553 | A1 | 12/2008 | Kraus | |
| 2009/0145202 | A1 | 6/2009 | Tokhtuev et al. | |
| 2009/0150086 | A1 * | 6/2009 | Tokhtuev | G01N 21/05 702/23 |
| 2010/0136705 | A1 | 6/2010 | Kojima et al. | |
| 2010/0237018 | A1 | 9/2010 | Hollebone et al. | |
| 2011/0045599 | A1 | 2/2011 | Erickson et al. | |
| 2012/0000488 | A1 | 1/2012 | Herdt et al. | |
| 2012/0028364 | A1 | 2/2012 | Kraus et al. | |
| 2012/0103076 | A1 * | 5/2012 | Schwarz | G01N 31/16 73/61.59 |
| 2012/0140227 | A1 * | 6/2012 | Willuweit | G01J 3/0256 356/413 |
| 2012/0149121 | A1 | 6/2012 | Tokhtuev et al. | |
| 2012/0172437 | A1 | 7/2012 | Kraus et al. | |
| 2012/0273351 | A1 * | 11/2012 | Kraus | G05B 13/00 204/407 |
| 2013/0048535 | A1 | 2/2013 | Wang et al. | |
| 2013/0264059 | A1 | 10/2013 | Keasler et al. | |
| 2013/0264293 | A1 | 10/2013 | Keasler et al. | |
| 2014/0141523 | A1 | 5/2014 | Tokhtuev et al. | |
| 2014/0273244 | A1 | 9/2014 | Bolduc et al. | |
| 2016/0077014 | A1 * | 3/2016 | Kraus | G01N 31/166 436/163 |
| 2016/0282820 | A1 | 9/2016 | Perez et al. | |
| 2017/0234842 | A1 * | 8/2017 | Reed | B01F 15/00227 422/501 |
| 2017/0276630 | A1 | 9/2017 | Vu et al. | |
| 2019/0033273 | A1 * | 1/2019 | Kraus | G01N 31/166 |
| 2019/0086375 | A1 * | 3/2019 | Ryther | G01N 31/166 |
| 2019/0310235 | A1 | 10/2019 | Kraus et al. | |
| 2019/0317063 | A1 * | 10/2019 | Kraus | G01N 31/16 |

FOREIGN PATENT DOCUMENTS

| | | | |
|---|---|---|---|
| EP | 159243 | * | 10/1985 |
| JP | 64-23262 | * | 1/1989 |
| JP | H06-58882 A | | 3/1994 |
| JP | 2002-131204 | * | 5/2002 |

OTHER PUBLICATIONS

Marcos, J. et al, Analytica Chimica Acta 1992, 261, 489-494.*
Marcos, J. et al, Analyst 1992, 117, 1629-1633.*
Sanz-Martinez, A. et al, Analyst 1992, 117, 1761-1765.*
Fuhrmann, B. et al, Journal of Automatic Chemistry 1993, 15, 209-216.*
Yarnitzky, C. N. et al, Taianta 1993, 40, 1937-1941.*
Garcia, I. L. et al, Analytica Chimica Acta 1995, 308.*
Liang, Y. Y., Analytical Chemistry 1990, 62, 2504-2506.*
Korn, M. et al, Analytics Chimica Acta 1995, 313, 177-184.*
Albertus, F. et al, Analyst 1999, 124, 1373-1381.*
Honorato, R. S. et al, Analytica Chimica Acta 1999, 396, 91-97.*
Tan, A. et al, Laboratory Robotics and Automation 2000, 12, 108-113.*
Paim, A. P. S. et al, Analytical Sciences 2000, 16, 487-491.*

(56) References Cited

OTHER PUBLICATIONS

Fossum, T. K. et al, Encyclopedia of Analytical Chemistry 2006, 1-15.*

Borges, S. S. et al, Journal of Automated Methods and Management in Chemistry 2007, paper 46219, 6 pages.*

Crispino, C. C. et al, Analytical Methods 2014, 6, 302-307.*

Sully, B. D., et al., "The Analysis of Solutions of Per-Acids and Hydrogen Peroxide," Analyst, Aug. 1962, pp. 653-657, vol. 87.

Almeida, C. M. N. V., et al., "An Automatic Titrator Based on a Multicommutated Unsegmented Flow System Its Application to Acid-Base Titrations," Analytica Chimica Acta, 2000, pp. 213-223, vol. 407, No. 1.

Hetherington, M. A., et al., "A Novel PC-Based Gravimetric Autotitrator With A Multi-Solution Delivery System," Canadian Journal of Chemistry, 1995, pp. 1374-1379, vol. 73, No. 8.

Wojtowicz, M., et al., "Novel Approaches to Analysis by Flow Injection Gradient Titration," Analytica Chimica Acta, 2007, pp. 78-83, vol. 600, No. 1.

Salgado, et al., Spectrophotometric Determination of the pKa, Isosbestic Point and Equation of Absorbance vs. pH for a Universal pH Indicator, American Journal of Analytical Chemistry, 2014, 5, pp. 1290-1301.

Blaedel W.J. et al., Continuous Automated, Buretless Titrator with Direct Readout, Analytical Chemistry, vol. 36, No. 8 (Jul. 1964) pp. 1617-1623.

Katsumata, Hideyuki et al., Potentiometric flow titration of iron(II) and chromium(VI) based on flow rate ratio of a titrant to a sample, Talanta 48 (1999) pp. 135-141.

Marcos, J. et al., Automatic titrations in unsegmented flow systems based on variable flow-rate patterns, Analytica Chemica Acta 261 (1992) pp. 495-503.

Zagatto, E.A.G. et al., Mixing Chambers in Flow Analysis: a Review, Journal of Analytical Chemistry (2009) vol. 64, No. 5, pp. 524-532.

Tanaka, Hideji et al., Continuous On-Line True Titrations by Feedback-Based Flow Ratiometry. The Principle of Compensating Errors, Anal. Chem. 2000, 72, pp. 4713-4720.

Sasaki, Milton K. et al., Tracer-monitored flow titrations, Analytica Chimica Acta 902 (2016) pp. 123-128.

Santos, Joao L.M. et al., Multi-pumping flow systems: The potential of simplicity, Analytica Chimica Acta 600 (2007) pp. 21-28.

Pettas, I.A. et al., Simultaneous spectra-kinetic determination of peracetic acid and hydrogen peroxide in a brewery cleaning-in-place disinfection process, Analytica Chimica Acta 522 (2004) pp. 275-280.

Lavorante, Andre F. et al., Multi-commutation in Flow Analysis: A Versatile Tool for the Development of the Automatic Analytical Procedure Focused on the Reduction of Reagent Consumption, Spectroscopy Letters 39 (2006) pp. 631-650.

Arnold, Dennis P., Automated Titrations Using a Discontinuous Programmed Flow Analyzer, Anal. Chem. 1989, vol. 61, pp. 2109-2116.

Bendikov, Tatyana A. et al., Automated Titrations with an Alternate Flow, Linear Speed, Variation System. Applications to Amperometric, Biamperometric, and Spectrophotometric Titrations, Instrumentation Science & Technology, vol. 30, No. 4, pp. 371-386 (2002).

Fleet, Bernard et al., Gradient Titration—A Novel Approach to Continuous Monitoring Using Ion-Selective Electrodes, Analytical Chemistry, vol. 46, No. 1, Jan. 1974, pp. 9-11.

Fuhrmann, B. et al., Volumetric triangle-programmed flow titrations based on precisely generated concentration gradients, Analytica Chimica Acta, 282 (1993) pp. 397-406.

Lima, Jose L.F.C. et al., Multi-pumping flow systems: an automation tool, Taianta 64 (2004) pp. 1091-1098.

Marcos, Juliana et al., Photometric Determination of Acidity Constants by the Flow Gradient Technique without pH Measurements, Anal. Chem. 1990, vol. 62, No. 20, pp. 2237-2241.

Yarnitzky, Chaim N. et al., Automated Titrations with an Alternate Flow: Linear Speed Variation System, Instrumentation Science & Technology, 23(2) (1995) pp. 91-102.

* cited by examiner

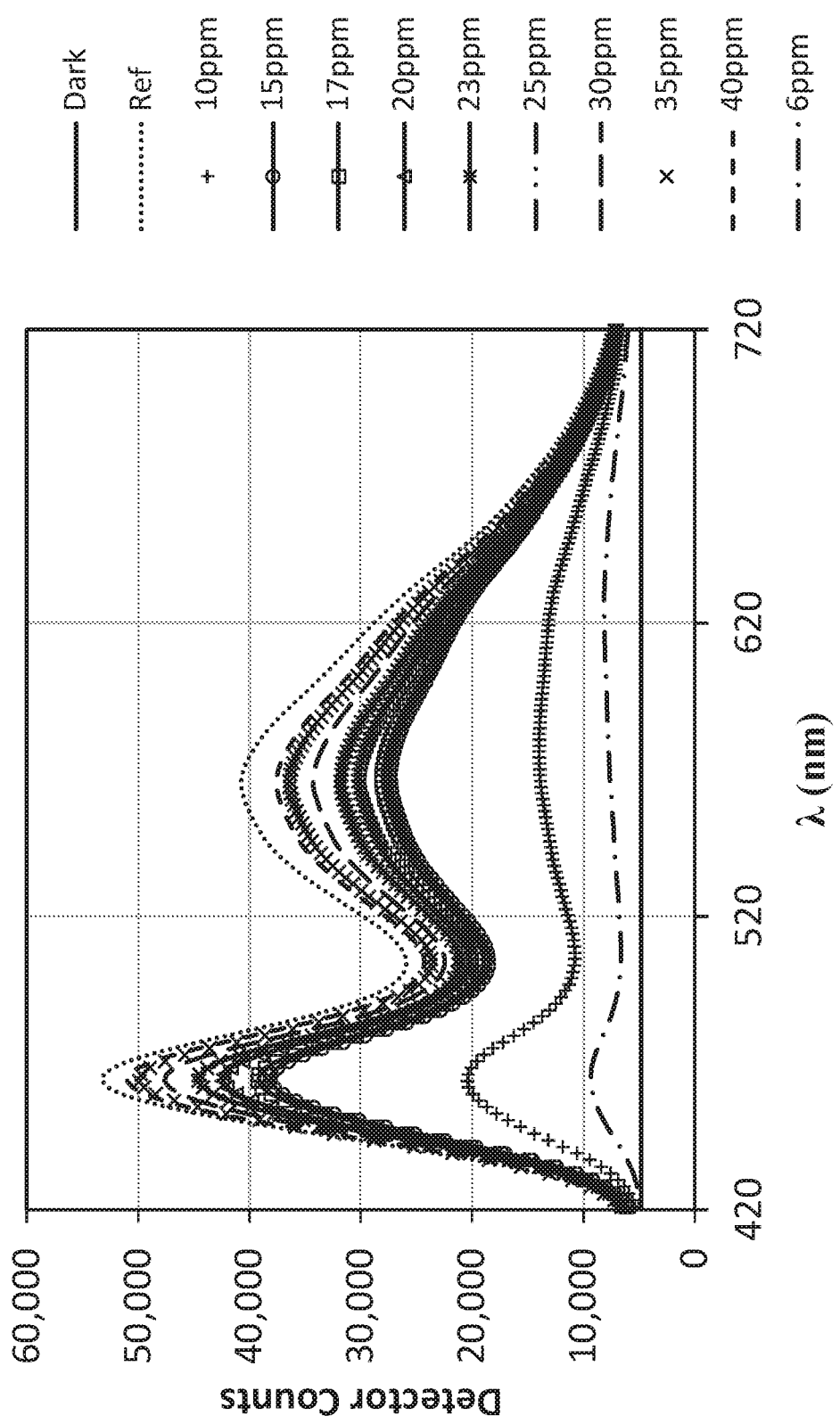

METHODS FOR COLORIMETRIC ENDPOINT DETECTION AND MULTIPLE ANALYTE TITRATION SYSTEMS

CROSS REFERENCE TO RELATED APPLICATIONS

This application claims priority to U.S. Provisional Patent Application Ser. No. 62/654,715 filed on Apr. 9, 2018, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

Systems for quantifying one or more target analyte concentrations in a process solution are provided and can be used, for example, in methods for quantifying a target analyte concentration. These systems and methods include continuous automated titration methods that use titration chemistries to measure the target analyte concentration in the process solution. The methods provide for efficient and robust automated titration methods for a variety of target analytes and can include methods that analyze more than one analyte and that provide for a dynamic range for measurement of more than one target analyte concentration.

BACKGROUND OF THE INVENTION

Titration is a method well known and practiced to determine concentrations of components of a solution. Titrations of various chemistries are practiced, wherein generally a titrant is added to a solution in which it reacts with select components thereof. Once the entirety of the reacting component has reacted with the known titrant, a measureable or noticeable change occurs, indicating the reaction is complete. In some cases, the noticeable change comprises a color change. Color changes, for example, can vary widely across various chemistries of titrations.

While known as a science, titrations can be a tedious process, requiring careful practice by a chemist or other skilled operator. In some instances, it can be impractical to keep a chemist or other technician on hand to perform titrations, though data acquired by titrations can be desirable. Automated titrators can be implemented which attempt to judge when complete reactions have occurred and the appropriate titration calculations to determine an amount of a component in a solution. However, depending on the reaction, it can be difficult for an automated process to accurately determine an endpoint of a reaction. Additionally, automated systems can require a large amount of time to complete a process, which can be undesirable or unacceptable if a solution needs monitoring at certain time intervals.

SUMMARY OF THE INVENTION

An automated titration system is provided that includes a reaction manifold for mixing a continuously flowing and refreshed sample stream containing an unknown concentration of one or more analytes with titrants; a sample pump for pumping the continuously flowing and refreshed sample stream into the reaction manifold; a first titrant pump for pumping the first titrant into the reaction manifold to contact the continuously flowing and refreshed sample stream; a multi-wavelength detector for detecting a first titration endpoint of the reaction between the analyte and the first titrant; and a controller communicatively coupled to the sample pump, the first titrant pump, and the detector, wherein the controller controls the sample pump to set the flow rate of the continuously flowing and refreshed sample stream, controls the first titrant pump to set the flow rate of the first titrant, and receives data from the detector to detect the first titration endpoint for the reaction between the analyte and the first titrant and determine the analyte concentration at the first titration endpoint.

An automated titration system is provided that includes a reaction manifold for mixing a sample stream containing an unknown concentration of an analyte with a first titrant; a sample pump for pumping the sample stream into the reaction manifold; a first titrant pump for pumping the first titrant into the reaction manifold to contact the sample stream; a multi-wavelength detector for detecting a first titration endpoint of the reaction between the analyte and the first titrant; and a controller communicatively coupled to the sample pump, the first titrant pump, and the detector, wherein the controller controls the sample pump to set the flow rate of the sample stream, controls the first titrant pump to set the flow rate of the first titrant, and receives data from the detector to detect the first titration endpoint for the reaction between the analyte and the first titrant and determine the analyte concentration at the first titration endpoint.

The automated titration systems described herein can have the sample stream contain two or more analytes.

Additionally, the automated titration systems described herein can further comprise a second titrant pump for pumping a second titrant into the reaction manifold to contact the batch sample stream or the continuously flowing and refreshed sample stream. The multi-wavelength detector can further detect a second titration endpoint of a reaction between the analyte and the second titrant, the controller is further communicatively coupled to the second titrant pump, and the controller further controls the second titrant pump to set the flow rate of the second titrant and receives data from the detector to detect the second titration endpoint for the reaction between the analyte and the second titrant and determine the analyte concentration at the second titration endpoint.

The automated titration systems described herein can have the second titrant react with a second analyte.

The automated titration systems described herein can further comprise a third titrant pump for pumping a third titrant into the reaction manifold to contact the batch sample stream or the continuously flowing and refreshed sample stream. The multi-wavelength detector can further detect a third titration endpoint of a reaction between the analyte and the third titrant, the controller is further communicatively coupled to the third titrant pump, and the controller further controls the third titrant pump to set the flow rate of the third titrant and receives data from the detector to detect the third titration endpoint for the reaction between the analyte and the third titrant and determine the analyte concentration at the third titration endpoint.

The automated titration systems described herein can have the third titrant react with a third analyte.

The automated titration systems described herein can have the multi-wavelength detector be capable of detecting signals in the ultraviolet to visible light range.

Also, the automated titration systems described herein can have the multi-wavelength detector be a spectrometer.

The automated titration systems described herein can have the reaction manifold comprise a liquid mixer downstream from the titrant inlet and upstream from the detector.

The automated titration systems described herein can also further comprise a conditioning manifold upstream from the titrant inlet and downstream from the sample stream inlet.

The automated titration system described herein can have the conditioning manifold comprise a liquid mixer.

The automated titration system described herein can have the conditioning manifold further comprise a mixing loop.

The automated titration systems described herein can further comprise a conditioning reagent pump for pumping a conditioning reagent into the conditioning manifold to mix with the continuously flowing and refreshed sample stream.

The automated titration system can have the conditioning reagent be a pH buffer, a reaction catalyst, a chemical indicator, a sequestrant, a surfactant, a conductivity modifying salt, an ion pair reagent, a biologically based chemical, or a combination thereof.

The automated titration systems described herein can have the conditioning reagent comprise potassium iodide, sulfuric acid, acetic acid, starch indicator, ammonium molybdate, or a combination thereof.

The automated titration system can have the conditioning reagent pump further comprise a first conditioning reagent pump for pumping a first conditioning reagent and a second conditioning reagent pump for pumping a second conditioning reagent.

The automated titration system can have the first conditioning reagent be a metal iodide and the second conditioning reagent is an indicator.

The automated titration systems described herein can have the conditioning reagent pump inject the conditioning reagent into the flowing sample stream, wherein the controller is communicatively coupled to the conditioning reagent pump and configured to control the conditioning reagent pump to set a flow rate of the conditioning reagent injected into the batch sample stream or the continuously flowing and refreshed sample stream.

The automated titration systems described herein can be used in methods for quantification of a target analyte.

For example, described herein is a method for quantification of a target analyte concentration in a sample stream comprising: continuously flowing and continuously refreshing the sample stream at a known flow rate through an analyzer comprising a manifold and a multi-wavelength detector; quantifying the target analyte concentration by continuously adding a titrant to the analyzer and setting a titrant concentration change by changing the titrant concentration through increasing or decreasing a flow rate of the titrant over a specified range; and detecting a titration endpoint for the reaction between the target analyte in the sample stream and the titrant within a specified target analyte concentration range.

Further, a method for quantification of a target analyte concentration in a sample stream can comprise adding the sample to an analyzer comprising a manifold and a multi-wavelength detector; quantifying the target analyte concentration by adding a titrant to the analyzer and setting a titrant concentration change by changing the titrant concentration through increasing or decreasing a flow rate of the titrant over a specified range; and detecting a titration endpoint for the reaction between the target analyte in the sample stream and the titrant within a specified target analyte concentration range; wherein the sample stream comprises two or more analytes.

The methods of quantification can have the sample stream comprise two or more analytes.

The method can have the sample stream further comprises a second analyte.

The methods described herein can further comprise quantifying the second analyte by continuously adding a second titrant to the batch sample stream or the continuously flowing and continuously refreshed sample stream.

The method can have the sample stream further comprise a third analyte.

The methods of quantification can further comprise quantifying the third analyte by continuously adding a third titrant to the batch sample stream or the continuously flowing and continuously refreshed sample stream.

The methods can have the known flow rate of the sample be from about 1 µL/minute to about 200 mL/minute.

The methods can have the known flow rate of the sample be from about 5 mL/minute to about 25 mL/minute.

The methods can further comprise continuously adding a conditioning reagent to the sample stream in a concentration proportional to the target analyte concentration.

The methods of quantification can further comprise detecting the titration endpoint using a multiple wavelength detector that is a defined distance from a point of titrant addition and calculating the titrant concentration using the distance between the detector and the point of titrant addition, the flow rate of the titrant, and the system volume.

The methods described herein can further comprise varying the titrant concentration by controlling its flow rate wherein the detector signal from the reaction product of the titration is correlated in time with the titrant concentration.

The methods can further comprise dosing a calibrant of known concentration into the sample stream, detecting the calibrant concentration, and calculating the response.

The methods of quantification can further comprise controlling the titrant concentration using a feedback loop that responds to a detector detecting the reaction between the titrant and the target analyte.

The methods described herein where the conditioning reagent treats the sample stream to improve detection of the target analyte.

The methods can have the detection of the target analyte be improved by improving the sensitivity of the detection method.

The methods described herein can have the conditioning reagent be a pH buffer, a reaction catalyst, a chemical indicator, a sequestrant, a surfactant, a conductivity modifying salt, an ion pair reagent, a biologically based chemical, or a combination thereof.

The methods of quantification can have the conditioning reagent comprise potassium iodide, acetic acid, starch indicator, or a combination thereof.

The method described herein can have the flow rate of the continuously flowing and continuously refreshed sample stream is increased or decreased depending on whether the titration endpoint can be detected within the specified target analyte concentration range.

BRIEF DESCRIPTION OF THE DRAWINGS

FIG. 4A shows spectra at each test concentration from 6-40 ppm on an approximately 15 ppm peracid sample.

DETAILED DESCRIPTION

Figure 1:
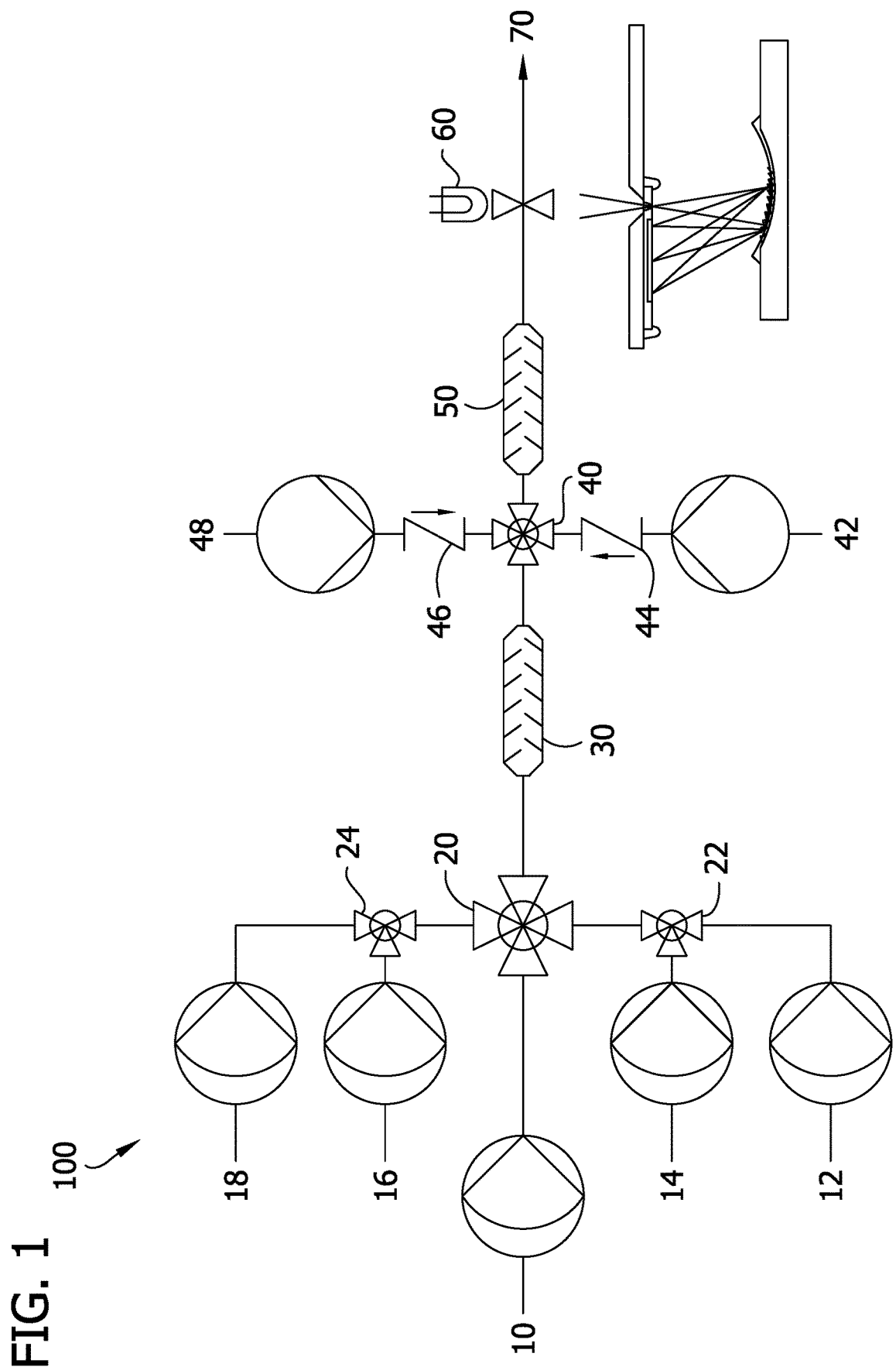
FIG. 1 is a schematic for an automated titration system having two analytes in the sample and two titrant pumps, four conditioning reagent pumps, and a multi-wavelength detector in the system.

The automated titration systems and methods described herein have been developed to provide analysis of more than one analyte. These systems and methods have the advantages that the endpoint is detected using a multi-wavelength detector that allows detection of titration endpoints in a range of visible wavelengths. The use of a spectrometer and broad spectrum source enables the titrator detector system to select the optimal wavelength required for the intended titration application. The optimum wavelength can be selected by running an absorbance scan of the desired molecule (e.g., the starch-iodine complex). Typically, the wavelength with the maximum absorbance is used for the detection of the endpoint. However, when the absorbance response exceeds the desired response, it may be advantageous to use the wavelength of a secondary absorbance peak instead. If a decreased response for a particular molecule is desired, as in the case where the concentration of the molecule makes the maximum absorbance of a major absorbance peak very high, the sensitivity of the instrument's optics can be exceeded. Then a peak with a lower maximum absorbance would be used so that the high sample concentration can be measured with greater accuracy at a lower absorbance.

This system configuration can also increase the dynamic range because lower concentration analytes can be measured using a major absorbance peak and higher concentration analytes can be measured using a minor peak without changing the detector system. In this way, the higher concentration analyte and lower concentration analyte can both be measure within the range of the instrument. This system also allows the instrument to use the same detector system for different titrations having different absorbance peaks for the molecule being measured.

Additionally, a series of titrant pumps can inject titrants into the sample stream to react with the more than one analyte and simultaneously detect the concentration of the multiple analytes. A single instrument having the capability to add all the reagents required for the analysis of a sample having more than one analyte is capable of performing all the tests using a single spectrometer as the detector. In contrast, typically, multiple detectors are required due to the variations in spectral response indicating the endpoint of the titration had been reached.

An automated titration system is provided that includes a reaction manifold for mixing a continuously flowing and refreshed sample stream containing an unknown concentration of one or more analytes with titrants; a sample pump for pumping the continuously flowing and refreshed sample stream into the reaction manifold; a first titrant pump for pumping the first titrant into the reaction manifold to contact the continuously flowing and refreshed sample stream; a multi-wavelength detector for detecting a first titration endpoint of the reaction between the analyte and the first titrant; and a controller communicatively coupled to the sample pump, the first titrant pump, and the detector, wherein the controller controls the sample pump to set the flow rate of the continuously flowing and refreshed sample stream, controls the first titrant pump to set the flow rate of the first titrant, and receives data from the detector to detect the first titration endpoint for the reaction between the analyte and the first titrant and determine the analyte concentration at the first titration endpoint.

Also, an automated titration system is provided that includes a reaction manifold for mixing a batch sample stream containing an unknown concentration of an analyte with a first titrant; a sample pump for pumping the sample stream into the reaction manifold; a first titrant pump for pumping the first titrant into the reaction manifold to contact the sample stream; a multi-wavelength detector for detecting a first titration endpoint of the reaction between the analyte and the first titrant; and a controller communicatively coupled to the sample pump, the first titrant pump, and the detector, wherein the controller controls the sample pump to set the flow rate of the sample stream, controls the first titrant pump to set the flow rate of the first titrant, and receives data from the detector to detect the first titration endpoint for the reaction between the analyte and the first titrant and determine the analyte concentration at the first titration endpoint.

The automated titration systems described herein can have the sample stream contain two or more analytes.

Additionally, the automated titration systems described herein can further comprise a second titrant pump for pumping a second titrant into the reaction manifold to contact the batch sample stream or the continuously flowing and refreshed sample stream. The multi-wavelength detector can further detect a second titration endpoint of a reaction between the analyte and the second titrant, the controller is further communicatively coupled to the second titrant pump, and the controller further controls the second titrant pump to set the flow rate of the second titrant and receives data from the detector to detect the second titration endpoint for the reaction between the analyte and the second titrant and determine the analyte concentration at the second titration endpoint.

The automated titration systems described herein can have the second titrant react with a second analyte.

The automated titration systems described herein can further comprise a third titrant pump for pumping a third titrant into the reaction manifold to contact the batch sample stream or the continuously flowing and refreshed sample stream. The multi-wavelength detector can further detect a third titration endpoint of a reaction between the analyte and the third titrant, the controller is further communicatively coupled to the third titrant pump, and the controller further controls the third titrant pump to set the flow rate of the third titrant and receives data from the detector to detect the third titration endpoint for the reaction between the analyte and the third titrant and determine the analyte concentration at the third titration endpoint.

The automated titration systems described herein can have the third titrant react with a third analyte.

The automated titration systems described herein can have the multi-wavelength detector be capable of detecting signals in the ultraviolet to visible light range.

Also, the automated titration systems described herein can have the multi-wavelength detector be a spectrometer.

The automated titration systems described herein can have the reaction manifold comprise a liquid mixer downstream from the titrant inlet and upstream from the detector.

The automated titration systems described herein can also further comprise a conditioning manifold upstream from the titrant inlet and downstream from the sample stream inlet.

The automated titration system described herein can have the conditioning manifold comprise a liquid mixer.

The automated titration system described herein can have the conditioning manifold further comprise a mixing loop.

The automated titration systems described herein can further comprise a conditioning reagent pump for pumping a conditioning reagent into the conditioning manifold to mix with the continuously flowing and refreshed sample stream.

The automated titration system can have the conditioning reagent be a pH buffer, a reaction catalyst, a chemical indicator, a sequestrant, a surfactant, a conductivity modifying salt, an ion pair reagent, a biologically based chemical, or a combination thereof.

The automated titration systems described herein can have the conditioning reagent comprise potassium iodide, sulfuric acid, acetic acid, starch indicator, ammonium molybdate, or a combination thereof.

The automated titration system can have the conditioning reagent pump further comprise a first conditioning reagent pump for pumping a first conditioning reagent and a second conditioning reagent pump for pumping a second conditioning reagent.

The automated titration system can have the first conditioning reagent be a metal iodide and the second conditioning reagent is an indicator.

The automated titration systems described herein can have the conditioning reagent pump inject the conditioning reagent into the batch sample stream or the flowing sample stream, wherein the controller is communicatively coupled to the conditioning reagent pump and configured to control the conditioning reagent pump to set a flow rate of the conditioning reagent injected into the continuously flowing and refreshed sample stream.

The automated titration systems described herein can be used in methods for quantification of a target analyte.

For example, described herein is a method for quantification of a target analyte concentration in a sample stream comprising: continuously flowing and continuously refreshing the sample stream at a known flow rate through an analyzer comprising a manifold and a multi-wavelength detector; quantifying the target analyte concentration by continuously adding a titrant to the analyzer and setting a titrant concentration change by changing the titrant concentration through increasing or decreasing a flow rate of the titrant over a specified range; and detecting a titration endpoint for the reaction between the target analyte in the sample stream and the titrant within a specified target analyte concentration range.

Alternatively, described herein is a method for quantification of a target analyte concentration in a batch sample stream comprising adding the sample to an analyzer comprising a manifold and a multi-wavelength detector; quantifying the target analyte concentration by adding a titrant to the analyzer and setting a titrant concentration change by changing the titrant concentration through increasing or decreasing a flow rate of the titrant over a specified range; and detecting a titration endpoint for the reaction between the target analyte in the sample stream and the titrant within a specified target analyte concentration range; wherein the sample stream comprises two or more analytes.

The methods of quantification can have the sample stream comprise two or more analytes.

The method can have the sample stream further comprises a second analyte.

The methods described herein can further comprise quantifying the second analyte by continuously adding a second titrant to the batch sample stream or the continuously flowing and continuously refreshed sample stream.

The method can have the sample stream further comprise a third analyte.

The methods of quantification can further comprise quantifying the third analyte by continuously adding a third titrant to the batch sample stream or the continuously flowing and continuously refreshed sample stream.

The methods can have the known flow rate of the sample be from about 1 µL/minute to about 200 mL/minute.

The methods can have the known flow rate of the sample be from about 5 mL/minute to about 25 mL/minute.

The methods can further comprise continuously adding a conditioning reagent to the sample stream in a concentration proportional to the target analyte concentration.

The methods of quantification can further comprise detecting the titration endpoint using a multiple wavelength detector that is a defined distance from a point of titrant addition and calculating the titrant concentration using the distance between the detector and the point of titrant addition, the flow rate of the titrant, and the system volume.

The methods described herein can further comprise varying the titrant concentration by controlling its flow rate wherein the detector signal from the reaction product of the titration is correlated in time with the titrant concentration.

The methods can further comprise dosing a calibrant of known concentration into the sample stream, detecting the calibrant concentration, and calculating the response.

The methods of quantification can further comprise controlling the titrant concentration using a feedback loop that responds to a detector detecting the reaction between the titrant and the target analyte.

The methods described herein where the conditioning reagent treats the sample stream to improve detection of the target analyte.

The methods can have the detection of the target analyte be improved by improving the sensitivity of the detection method.

The methods described herein can have the conditioning reagent be a pH buffer, a reaction catalyst, a chemical indicator, a sequestrant, a surfactant, a conductivity modifying salt, an ion pair reagent, a biologically based chemical, or a combination thereof.

The methods of quantification can have the conditioning reagent comprise potassium iodide, acetic acid, starch indicator, or a combination thereof.

The method described herein can have the flow rate of the continuously flowing and continuously refreshed sample stream is increased or decreased depending on whether the titration endpoint can be detected within the specified target analyte concentration range.

FIG. 1 is a schematic diagram of an automated titrator 100. The controller can control the parameters of a sample pump 10, a first conditioning reagent pump 12, a second conditioning reagent pump 14, a third conditioning reagent pump 16, a fourth conditioning reagent pump 18, a first 3-way valve 22, a second 3-way valve 24, a mixing valve 20, a 4-way valve 40, a first titrant pump 42 in fluid communication with a valve 44, a second titrant pump 48 in fluid communication with a valve 46, and a detector 60. The sample flows through the sample pump 10, through a line, and through a mixing valve 20, to a first liquid mixer 30. The first conditioning reagent flows through the first conditioning reagent pump 12, through a line, and through the mixing valve 20, to the first liquid mixer 30. The second conditioning reagent flows through the second conditioning reagent pump 14, through a line, and through the mixing valve 20, to the first liquid mixer 30. The third conditioning reagent flows through the third conditioning reagent pump 16, through a line, and through the mixing valve 20, to the first liquid mixer 30. The fourth conditioning reagent flows through the fourth conditioning reagent pump 18, through a line, and through the mixing valve 20, to the first liquid mixer 30. Once the sample and first through fourth conditioning reagents are mixed in the first liquid mixer 30, the mixture of sample and conditioning reagents becomes a conditioned sample and flows through the 4-way valve 40 where titrant is added from either the first titrant pump 42, the second titrant pump 44, or titrant is added from both the first titrant pump 42 and the second titrant pump 44. Once the titrant is added to the conditioned sample, a reaction mixture is formed and flows through a second liquid mixer 50 to the detector 60.

Figure 2:
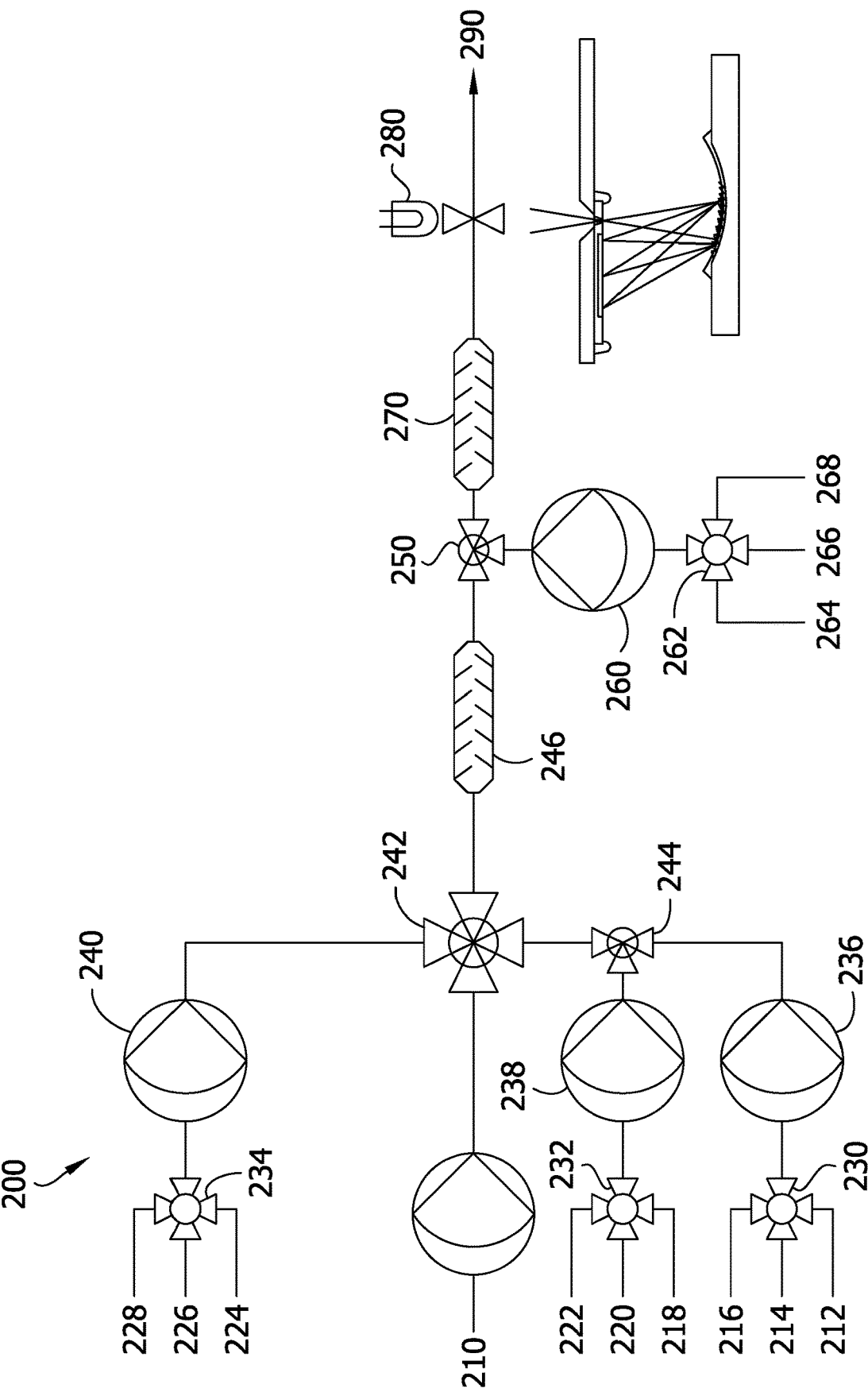
FIG. 2 is a schematic for an automated titration system having three analytes in the sample and three titrant pumps, three conditioning reagent pumps, and a multi-wavelength detector in the system.

FIG. 2 is a schematic diagram of an automated titrator 200. The controller can control the parameters of a variable flow rate sample pump 210, a first conditioning reagent pump 236, a second conditioning reagent pump 238, a third conditioning reagent pump 240, a first selector valve 230, a second selector valve 232, a third selector valve 234, a first 3-way valve 244, a mixer valve 242, a first liquid mixer 246, a 3-way valve 250, a titrant pump 260, a selector valve 262, a second liquid mixer 270, and a detector 280. The sample flows through the sample pump 210, through a line, and through a mixing valve 242, to a first liquid mixer 246. A series of conditioning reagents 212, 214, 216 are connected to the first selector valve 230, and then to the first reagent pump 236. A second series of conditioning reagents 218, 220, 222 are connected to a second selector valve 232 and then to a second conditioning reagent pump 238. A third series of conditioning reagents 224, 226, 228 are connected to a third selector valve 234 and then to a third conditioning reagent pump 240. Once the sample and series of conditioning reagents are mixed in the first liquid mixer 246, the mixture of sample and conditioning reagents becomes a conditioned sample and flows through the second 3-way valve 250 where the first titrant 264, second titrant 266, or third titrant 268 flow through a fourth selector valve 262 and the titrant pump 260 into the sample stream through the second 3-way valve 250. The conditioned sample then flows through a second liquid mixer 270 and to the detector 280.

A wide variety of reagents known for standard titrations can be used, and a sufficient addition of titrant will cause the sample to change. In this continuous-mode operation, however, the determining factor of "sufficient addition of titrant" corresponds to the rate of titrant addition and concentration relative to the sample flow (and sample concentration). This is because the sample is flowing through the system continuously so fresh sample is continuously fed into the manifold comprising the first liquid mixer 30 or 246, the selector valve 40 or 3-way valve 250, and the second liquid mixer 50 or 270.

Accordingly, if the titrant is added too slowly, it will fail to adequately react with the conditioned sample and the conditioned sample may not change. Put another way, in a given amount of time, a certain volume of sample will flow through a particular point in the system. In order to achieve the desired change, then, there needs to be an appropriate volume of titrant that also flows past this point during the same time, which corresponds to a sufficient flow rate.

The process can be automated by a controller such as a programmable logic controller (PLC), using feedback mechanisms from the detector.

The flow rate of the titrant can be changed by an amount that is nonlinear over time. An exponential increase in flow rate, for example, will begin by making small changes in the flow rate while the concentrations involved are small. Over time, as the concentrations become larger (since the flow rate has continued to increase), small changes in flow rate become unnecessarily precise compared to the concentrations at hand and the flow rate can increase by larger amounts.

A low concentration of analyte can be accurately resolved by the small changes in concentrations early in the process, while large concentrations of analyte can be titrated in a shorter amount of time since the rate of titrant addition increases more rapidly over time.

For example, a low concentration of peroxide and peracid can be accurately resolved by the small changes in concentrations early in the process, while large concentrations of peracid and/or peroxide can be titrated in a shorter amount of time since the rate of titrant addition increases more rapidly over time.

An advantage of this method is that, with a fast enough optical arrangement, the analysis at each injection point can be done very quickly. Thus, only a small amount of titrant needs to be added at each point to determine whether or not the flow rate is sufficient for complete titration, and an overall small amount of titrant is needed to determine an endpoint. This process can be automated by a device such as a PLC in similar ways as described relating to alternatives, wherein the controller can control the flow rates of the sample and titrants, detect the titration by means of the optical arrangement, and calculate the concentration from the flow rates. In this embodiment, the controller performs the additional task of determining a "cut-off" point, above which titration occurred and below which it did not.

The method for quantification of a target analyte concentration in a sample stream includes continuously flowing and continuously refreshing the sample stream at a variable flow rate through an analyzer comprising a manifold and a detector; quantifying the target analyte concentration by continuously adding a titrant to the analyzer and setting a titrant concentration change by changing the titrant concentration through increasing or decreasing a flow rate of the titrant over a specified range; and detecting a titration endpoint for the reaction between the target analyte and the titrant within a specified target analyte concentration range.

The method described herein can further comprise a second titrant flow stream wherein the titrant concentration in the second titrant flow stream is different from the titrant concentration in the first titrant flow stream.

The method described herein can have a variable flow rate of the sample from about 0.1 µL/minute to about 1 mL/minute. The method described herein, can have the variable flow rate of the sample be from about 0.1 µL/minute to about 0.75 mL/minute, from about 0.1 µL/minute to about 0.5 mL/minute, from about 0.1 µL/minute to about 0.25 mL/minute, from about 0.1 µL/minute to about 0.1 mL/minute, from about 0.1 µL/minute to about 75 µL/minute, from about 0.1 µL/minute to about 50 µL/minute, from about 0.1 µL/minute to about 25 µL/minute, from about 0.1 µL/minute to about 10 µL/minute, from about 1 µL/minute to about 1 mL/minute, from about 1 µL/minute to about 0.75 mL/minute, from about 1 µL/minute to about 1 mL/minute, from about 1 µL/minute to about 25 mL/minute, from about 1 µL/minute to about 0.1 mL/minute, from about 1 µL/minute to about 75 µL/minute, from about 1 µL/minute to about 50 µL/minute, from about 1 µL/minute to about 25 µL/minute, from about 1 µL/minute to about 10 µL/minute, from about 5 µL/minute to about 1 mL/minute, from about 5 µL/minute to about 0.75 mL/minute, from about 5 µL/minute to about 1 mL/minute, from about 5 µL/minute to about 25 mL/minute, from about 5 µL/minute to about 0.1 mL/minute, from about 5 µL/minute to about 75 µL/minute, from about 5 µL/minute to about 50 µL/minute, from about 5 µL/minute to about 25 µL/minute, or from about 5 µL/minute to about 10 µL/minute.

The method described herein can have a variable flow rate of the sample be from about 1 mL/minute to about 200 mL/minute.

The method described herein can have a variable flow rate of the sample be from about 1 mL/minute to about 175 mL/minute, from about 1 mL/minute to about 150 mL/minute, from about 1 mL/minute to about 125 mL/minute, from about 1 mL/minute to about 100 mL/minute, from about 1 mL/minute to about 75 mL/minute, from about 1 mL/minute to about 50 mL/minute, from about 1 mL/minute to about 30 mL/minute, from about 2 mL/minute to about 200 mL/minute, from about 2 mL/minute to about 175 mL/minute, from about 2 mL/minute to about 150 mL/minute, from about 2 mL/minute to about 125 mL/minute, from about 2 mL/minute to about 100 mL/minute, from about 2 mL/minute to about 75 mL/minute, from about 2 mL/minute to about 50 mL/minute, from about 2 mL/minute to about 30 mL/minute, from about 5 mL/minute to about 200 mL/minute, from about 5 mL/minute to about 175 mL/minute, from about 5 mL/minute to about 150 mL/minute, from about 5 mL/minute to about 125 mL/minute, from about 5 mL/minute to about 100 mL/minute, from about 5 mL/minute to about 75 mL/minute, from about 5 mL/minute to about 50 mL/minute, preferably, from about 5 mL/minute to about 30 mL/minute.

The method described herein can have a variable flow rate of the sample from about 200 mL/minute to about 100 L/minute. The method described herein can have a variable flow rate of the sample be from about 200 mL/minute to about 75 L/minute, from about 200 mL/minute to about 50 L/minute, from about 200 mL/minute to about 25 L/minute, from about 200 mL/minute to about 10 L/minute, from about 200 mL/minute to about 5 L/minute, from about 200 mL/minute to about 2 L/minute, from about 200 mL/minute to about 1 L/minute, from about 500 mL/minute to about 100 L/minute, from about 500 mL/minute to about 75 L/minute, from about 500 mL/minute to about 50 L/minute, from about 500 mL/minute to about 25 L/minute, from about 500 mL/minute to about 10 L/minute, from about 500 mL/minute to about 5 L/minute, from about 500 mL/minute to about 2 L/minute, from about 500 mL/minute to about 2 L/minute, from about 1 L/minute to about 100 L/minute, from about 1 L/minute to about 75 L/minute, from about 1 L/minute to about 50 L/minute, from about 1 L/minute to about 25 L/minute, from about 1 L/minute to about 10 L/minute, from about 1 L/minute to about 8 L/minute, or from about 1 L/minute to about 5 L/minute.

The method described herein can have the detection range of the analyte concentration be a larger range at a lower sample flow rate and a smaller range at a higher sample flow rate.

The method described herein that further comprises continuously adding a conditioning reagent to the sample stream in a concentration proportional to the target analyte concentration.

The method described herein that further comprises detecting the titration endpoint using a detector that is a defined distance from a point of titrant addition and calculating the titrant concentration using the distance between the detector and the point of titrant addition, the flow rate of the titrant, and the system volume.

The method described herein that further comprises varying the titrant concentration by controlling its flow rate wherein the detector signal from the reaction product of the titration is correlated in time with the titrant concentration.

The method described herein that further comprises dosing a calibrant of known concentration into the sample stream, detecting the calibrant concentration, and calculating the response.

The method described herein can further comprise varying the titrant concentration using a mathematical function and identifying the titration endpoint within the specific target analyte concentration range.

The method described herein can have the mathematical function be a linear function, a step-wise function, a sine function, a square wave function, an exponential function, or a combination thereof.

The method described herein can further comprise controlling the titrant concentration using a feedback loop that responds to a detector detecting the reaction between the titrant and the target analyte.

The method described herein can further comprise measuring the titration endpoint using a stepwise titrant concentration change over the specified target analyte concentration range.

The method described herein can have the conditioning reagent treat the sample stream to improve detection of the target analyte.

The method described herein can have the detection of the target analyte be improved by improving the sensitivity of the detection method.

The method described herein can have the conditioning reagent be a pH buffer, an acid, a reaction catalyst, a chemical indicator, a sequestrant, a surfactant, a conductivity modifying salt, an ion pair reagent, a biologically based chemical, or a combination thereof.

The method described herein can have the titration endpoint be detected using a light-based detector.

The titration endpoint can be signaled by a detectable change at a complete reaction of the target analyte with the titrant. The detectable change can be a spectrophotometric change.

The titration system can be used to select the optimal wavelength for the intended titration application. For example, depending on the identity of the analyte, the titrant, and the composition of the sample stream at the endpoint, an optimal wavelength for the detection of the particular chemical species formed at the endpoint can be determined.

The light-based detector can be a spectrometer.

The spectrometer can pass light through a fixed optical cell where it can be detected by an image sensor.

Alternatively, the spectrometer can reflect light onto a sample and back through an entrance slit where the light can be detected by an image sensor.

The method described herein can have the conditioning reagent comprise potassium iodide, acetic acid, starch indicator, a molybdate, or a combination thereof.

The method described herein can have the flow rate of the continuously flowing and continuously refreshed sample stream be increased or decreased depending on whether the titration endpoint can be detected within the specified target analyte concentration range.

The method described herein can comprise continuously flowing the process solution through the analyzer comprising a manifold and a detector; quantifying the target analyte concentration by changing the flow rate and thereby the concentration of a titrant over a specified range; and detecting a titration endpoint for the reaction between the target analyte and a titrant within a specified target analyte concentration range.

The varieties of reagents that can be the conditioning reagent are well known to a person of ordinary skill in the art and can be applied to a wide variety of titration systems.

For the methods described herein, the target analyte can comprise hydrogen peroxide, a peroxyacetic acid, performic acid, peroxyoctanoic acid, or a combination thereof. Preferably, the target analyte comprises hydrogen peroxide, a peroxy acid, or a combination thereof.

For the methods described herein, the titrant comprises thiosulfate.

For the methods described herein, the conditioning reagent comprises potassium iodide, acetic acid, starch indicator, ammonium molybdate, or a combination thereof.

In each method described herein, the actual target analyte concentration can be directly detected or the actual target analyte concentration can be calculated from the detection of the concentration of a product of the reaction of the target analyte and the titrant.

The process is such that it can be implemented anywhere, such as at a sampling point in a processing facility or other industrial or commercial location not conducive to regularly performing standard titrations.

Additionally, the entire process can be completed in a short time; approximately 2 minutes and 40 seconds. Prior to rinsing and preparing the system to take another measurement, amount can be determined in less time; approximately 1 minute and 20 seconds.

The methods described herein can further include a calibration step. Calibration steps can be performed in-line, calibrating flow rates, measurements, and the like. Calibrations can be performed prior to every titration to provide increased accuracy to the measurement. A calibration can be performed after a predetermined number of measurements, or can be prompted by a user. In-line calibrations can be performed without substantially slowing down the analysis procedure. Such calibration can include injection of a sample of known concentration and confirming that the system measures the concentration accurately. To the extent the measurement is inaccurate; the system could self-adjust in order to accurately measure the sample of known concentration.

Alternatively, the optical sensor can signal transparency once it senses any radiation from the light source. Such systems can be used if the color change is sufficiently stark, such as the blue-black to transparent as described above, for example. It should be noted, however, that with proper optical equipment, such a stark color change may not be necessary in order for the optical arrangement to be able to accurately detect a titration endpoint. Not all reagents may be necessary. For example, the starch indicator can be omitted with the inclusion of certain optics in the optical arrangement.

"Amount," as used herein, refers to a generic measureable quantity such as mass, concentration, volume, etc.

Having described the invention in detail, it will be apparent that modifications and variations are possible without departing from the scope of the invention defined in the appended claims.

EXAMPLES

The following non-limiting examples are provided to further illustrate the present invention.

Figure 3A:
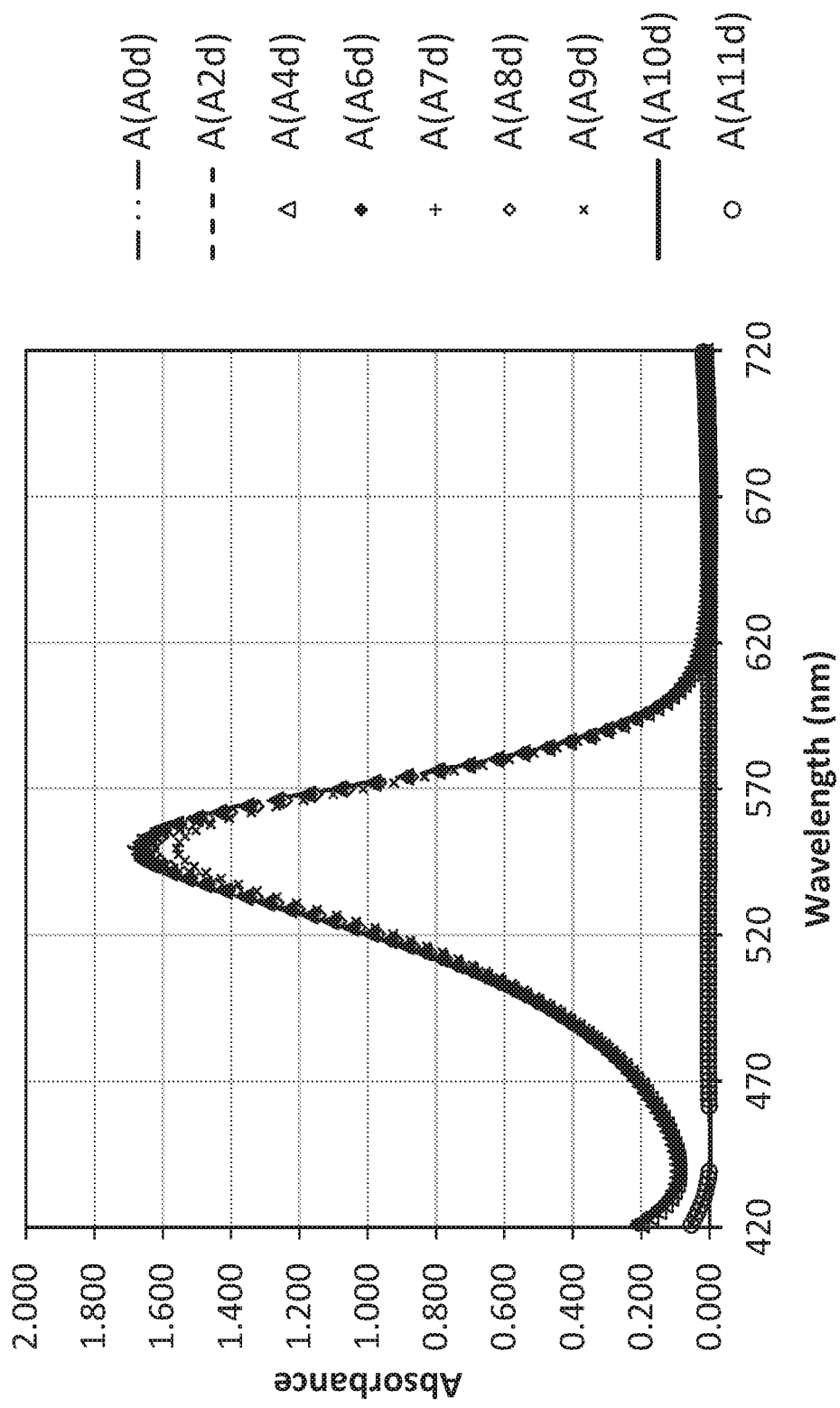
FIG. 3A is a graph of the absorbance versus the wavelength for a titration of caustic with a 0.1 N hydrochloric acid solution.

A sample containing caustic was titrated using the Ecolab Alkalinity Test Kit #301 using a 0.1 N HCl solution as the titrant. The operator measured the endpoint as 10 drops. The spectra are shown in FIGS. 3A and 3B.

Figure 3B:
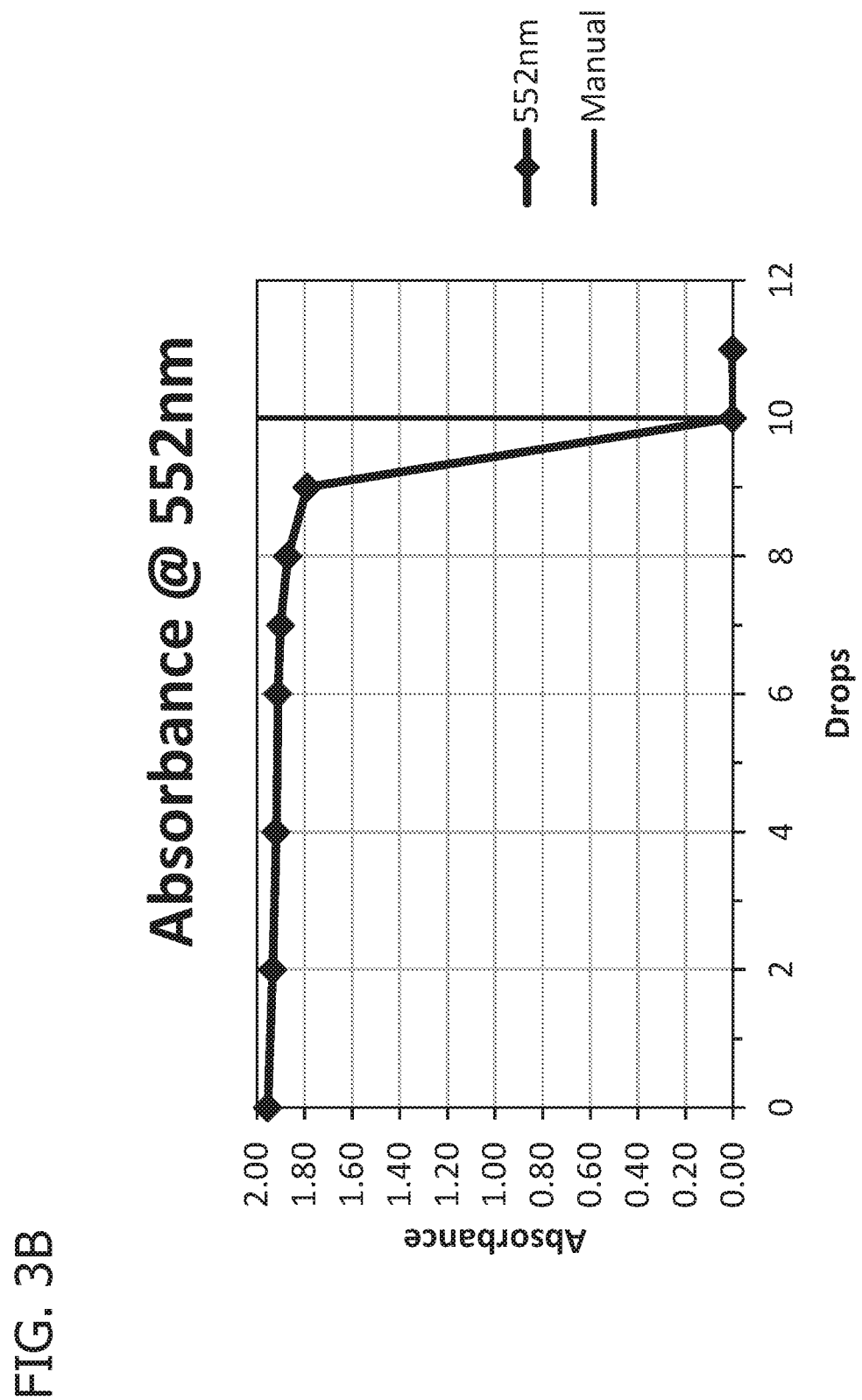
FIG. 3B is a graph of the absorbance versus number of drops for a titration of caustic with a 0.1 N hydrochloric acid solution.

The sharp inflection point at 10 drops in FIG. 3B illustrates the titration endpoint was measured by the multi-wavelength detector (e.g., Hamamatsu C12666MA).

The Hamamatsu C12666MA was interfaced to the lab prototype Fast Flow Titrator and used to monitor titration endpoint by collecting spectra at each test concentration from 6-40 ppm on an approximately 15 ppm peracid sample.

Figure 4B:
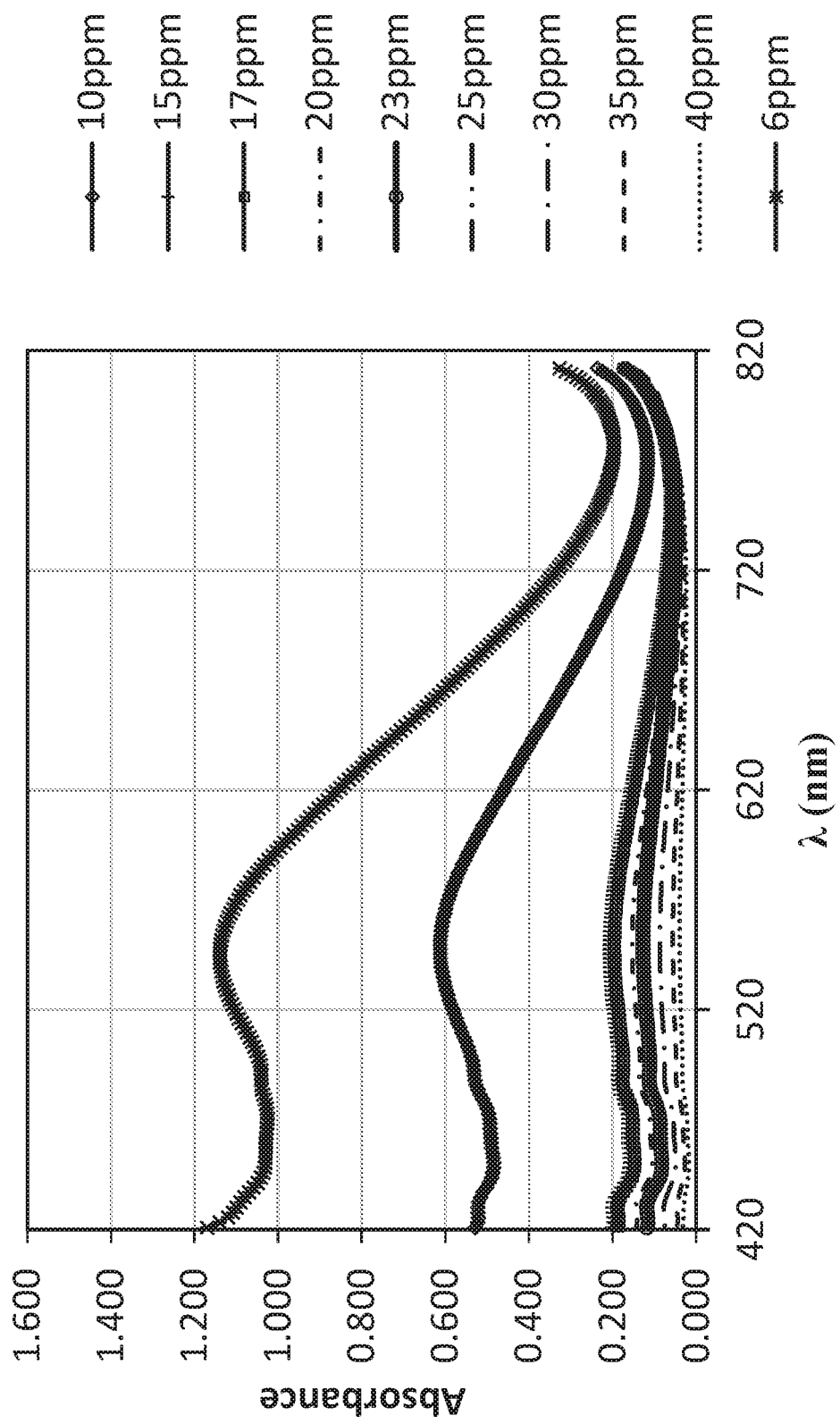
FIG. 4B is a graph of absorbance versus wavelength calculated from the spectra shown in FIG. 4A.

The LED source light passed through the sample stream of the fast flow titrator immediately downstream from the Banner sensor block. The spectra are shown in FIG. 4A and the absorbance at each wavelength was calculated from the sample, reference, and dark signals using the following equation and shown in FIG. 4B.

$$A_\lambda = \log_{10}\left(\frac{V_{ref,\lambda} - V_{dark,\lambda}}{V_{smpl,\lambda} - V_{dark,\lambda}}\right)$$

It was observed that, as the test concentration increased, the measured absorbance decreased. This is the measured transition of the blue starch-triiodide complex to a clear-colored solution at the endpoint where the triiodide has been completely reduced to iodide, the titration endpoint.

The current detectors employed in the two Ecolab automatic titrators use a detector that measures light at 680 nm. The spectra above indicate that the optimal wavelength for the analysis performed is approximately 550 nm. Absorbance data for 550 and 680 nm collected by the C12666MA were then compared with the titration results measured by the Banner sensor.

Figure 5:
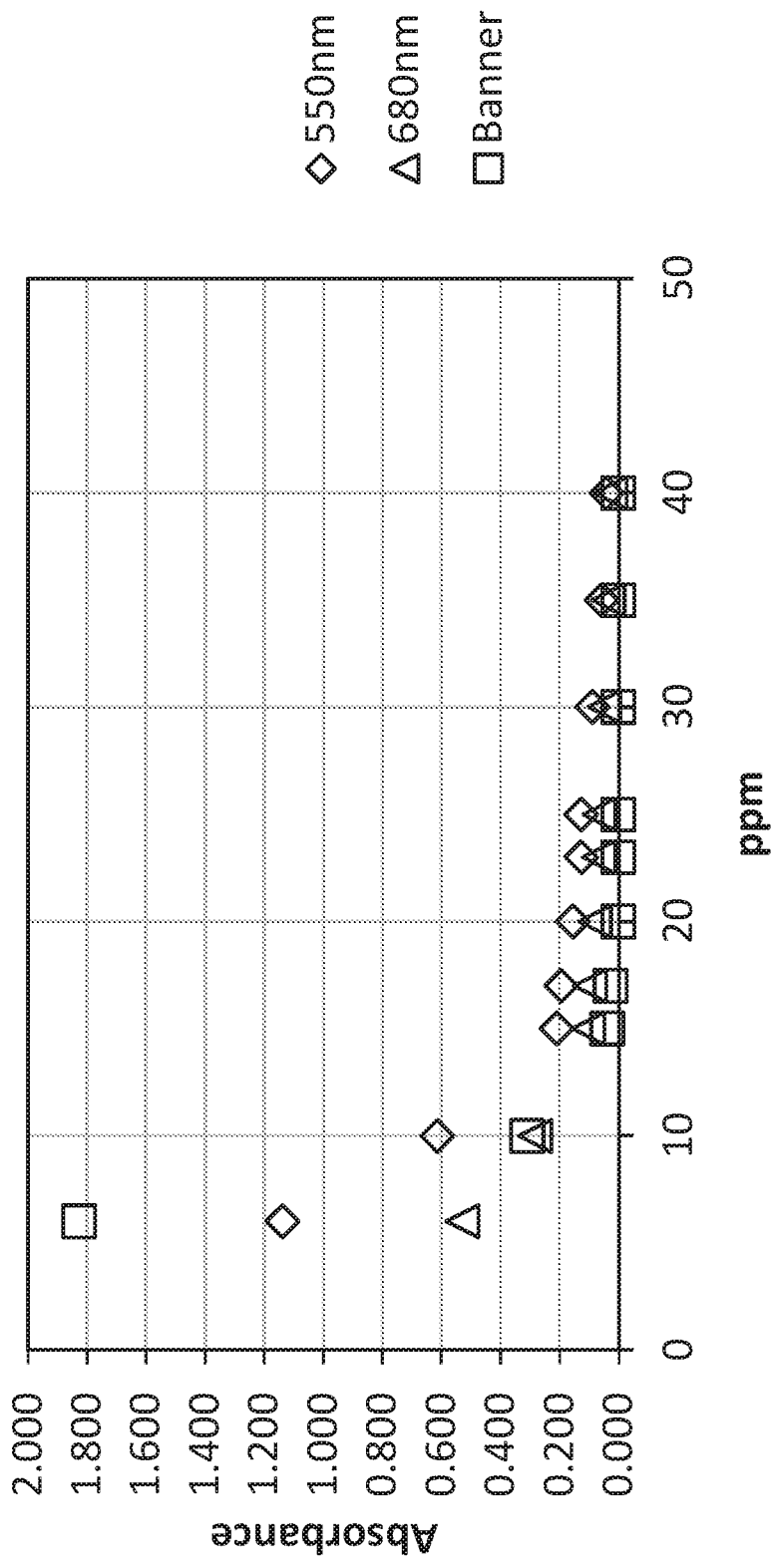
FIG. 5 is a graph of the absorbance versus concentration and showed identical trending of the absorbance versus concentration curve.

The results in FIG. 5 showed identical trending of the absorbance versus concentration curve. The fact that the absorbance values were not the same was attributed to the fact that neither of the optical systems was optimized to minimize stray light. Stray light introduced non-linearity into absorbance measurements.

The Hamamatsu C12666MA is just one example of an array spectrometer that may be used to collect spectral data during a titration with the proposed instruments.

Figure 6:
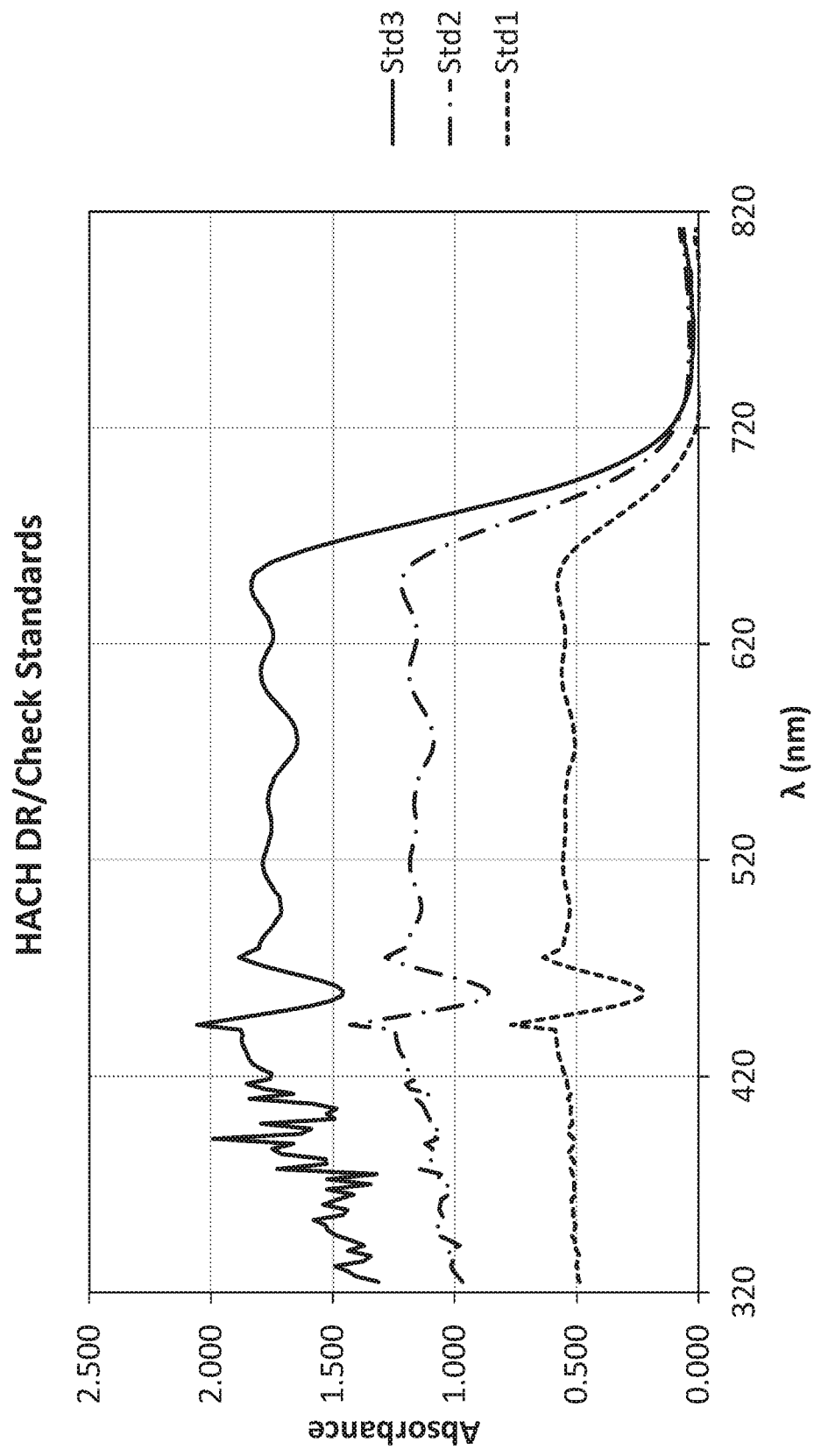
FIG. 6 is a graph of absorbance versus wavelength that shows the detector provides similar results to the standard.

The linearity of the C12666MA response was verified by comparing the absorbance collected with the C12666MA against certified standards. The spectra of HACH DR/Check standards in FIG. 6 were collected using the C12666MA.

The absorbances were then calculated as described above.

The absorbances of the samples were then compared against the certified absorbances at the published wavelengths.

| $\lambda$ | Hach | | | RS: 276-032C LED | | | Bias | | |
|---|---|---|---|---|---|---|---|---|---|
| (nm) | Std1 | Std2 | Std3 | Std1 | Std2 | Std3 | Std1 | Std2 | Std3 |
| 420 | 0.561 | 1.129 | 1.748 | 0.542 | 1.161 | 1.759 | −3.4% | 2.8% | 0.6% |
| 520 | 0.591 | 1.160 | 1.714 | 0.555 | 1.184 | 1.788 | −6.0% | 2.0% | 4.3% |
| 560 | 0.556 | 1.115 | 1.710 | 0.538 | 1.148 | 1.741 | −3.2% | 3.0% | 1.8% |
| 610 | 0.584 | 1.159 | 1.751 | 0.560 | 1.184 | 1.794 | −4.1% | 2.1% | 2.5% |

A Radio Shack 276-0320 white LED was used as the light source in this experiment. Note that the bias is less than 6% indicating that there is good agreement between the certified standards and the data collected using the C12666MA. As above, response could be improved if the optical configuration was optimized.

These data showed that the mini-spectrometer was a viable detector system for the automatic titrator system. The use of the mini-spectrometer then enables titrations with endpoint transitions other than 680 nm to be measured with a single broad-band detector.

Figure 7A:
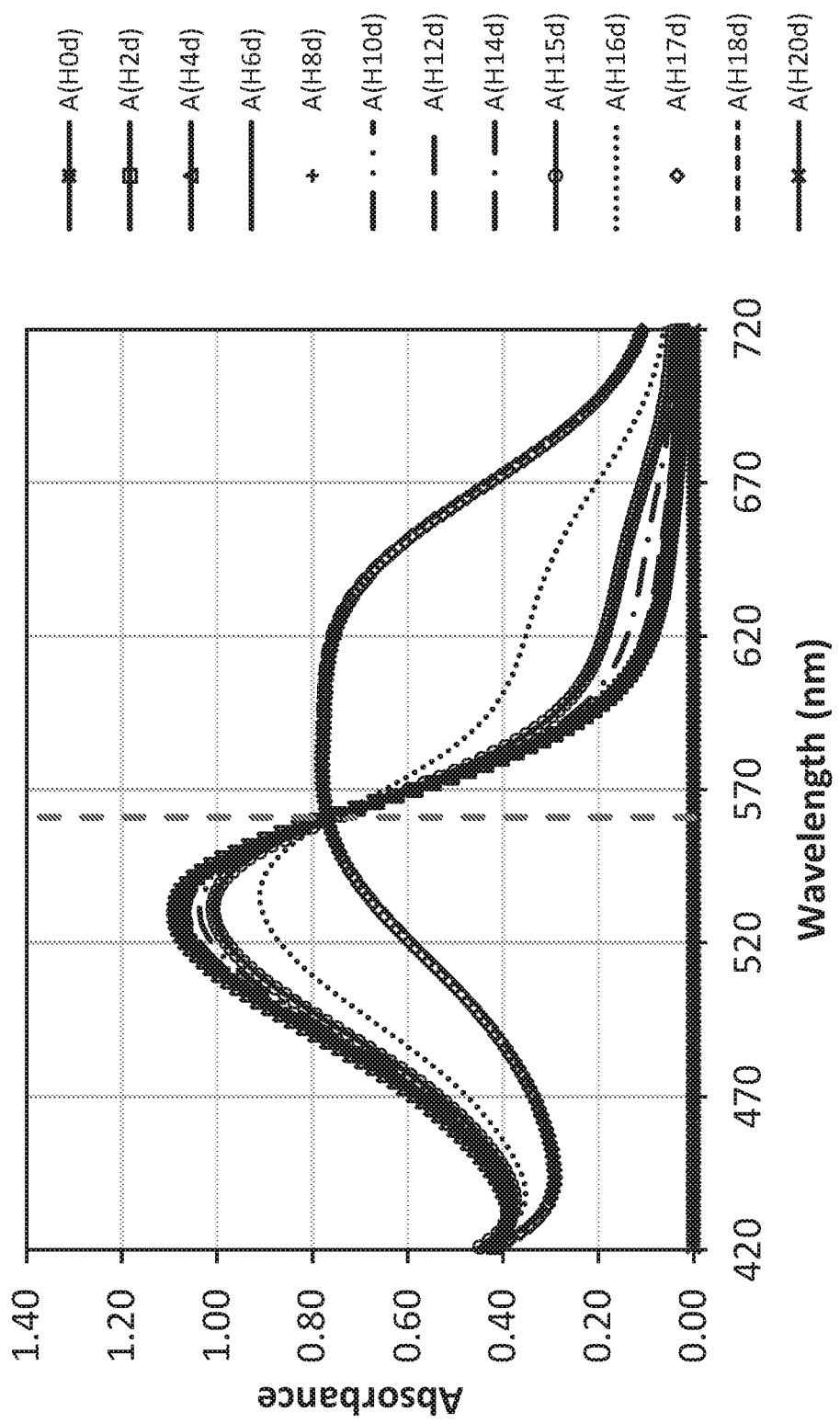
FIG. 7A is a graph of the absorbance versus wavelength of a titration using the Hardness test kit #307 to titrate laboratory 17-grain water.
Figure 7B:
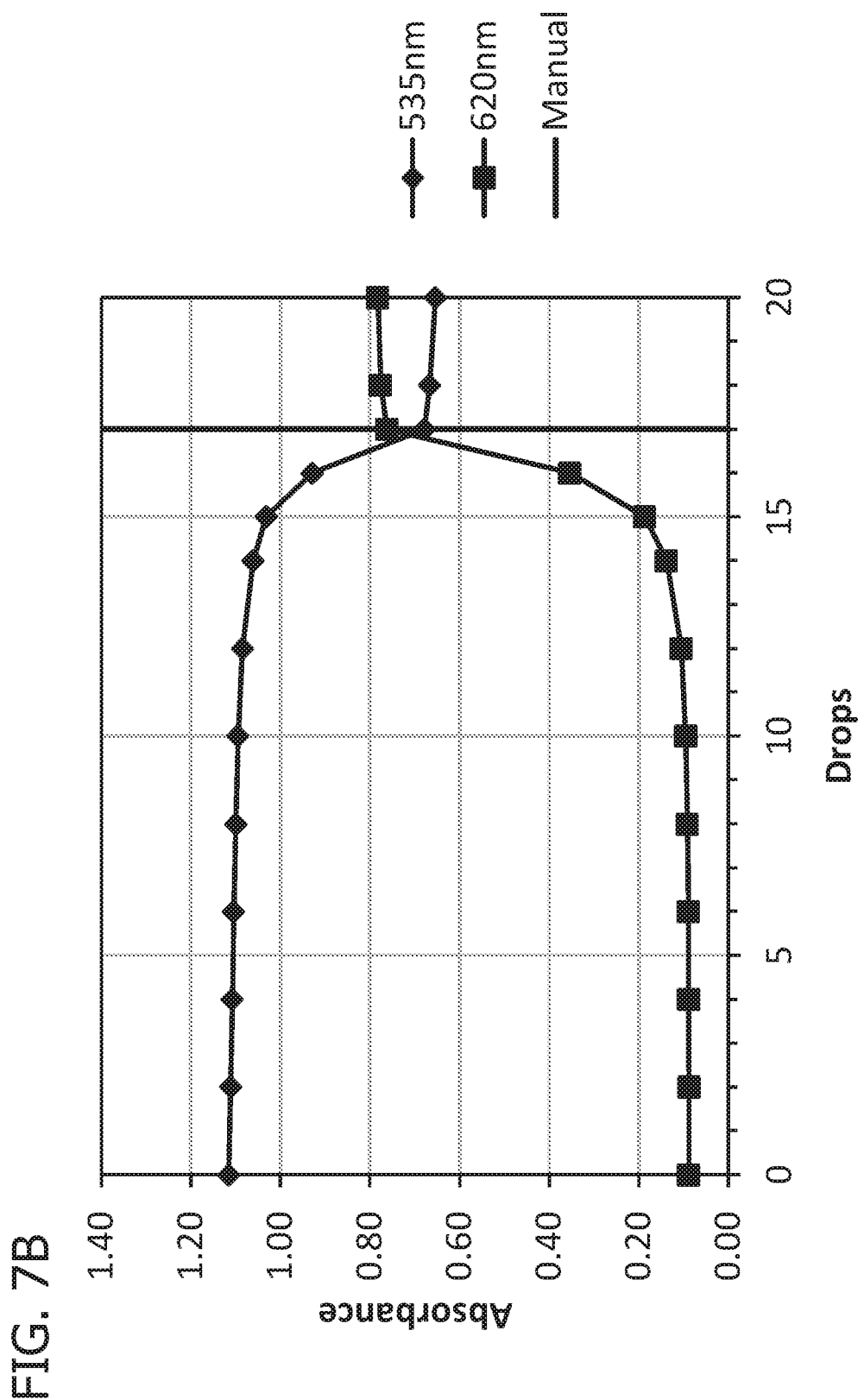
FIG. 7B shows the number of drops needed for the same titration.

The Hamamatsu C12666MA was used to monitor spectral changes as several Ecolab field test kits were used to titrate samples. The sample set-up described above was used for these titrations. The Hardness test kit #307 was used to titrate laboratory 17-grain water. The sample was titrated manually and then within the optical test system. The spectra and drop-wise response for the test are shown in FIGS. 7A and 7B.

The two peaks, 525 and 620 run, show the inflection point at 17 drops which is the operator-measured endpoint.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the methods without departing from the scope of the invention, it is intended that all matter contained in the above description and shown in the accompanying drawings shall be interpreted as illustrative and not in a limiting sense.

What is claimed is:

1. An automated titration system comprising
   a reaction manifold comprising a conditioning manifold and a second liquid mixer, the reaction manifold in fluid communication with the sample source and the titrant source for mixing a continuously flowing and refreshed sample stream containing an unknown concentration of a first analyte with a first titrant and an unknown concentration of a second analyte with a second titrant;
   a sample pump in fluid communication with a source of the sample and the reaction manifold continuously pumping the sample stream from the source of the sample into the reaction manifold through a sample stream inlet;
   a first titrant pump in fluid communication with a source of the first titrant and the reaction manifold for pumping the first titrant into the reaction manifold through a first titrant inlet to contact the continuously flowing and refreshed sample stream;
   a second titrant pump in fluid communication with a source of the second titrant and the reaction manifold for pumping the second titrant into the reaction manifold through a second titrant inlet to contact the continuously flowing and refreshed sample stream;
   a multi-wavelength detector in fluid communication with the reaction manifold for detecting a first titration endpoint of the reaction between the first analyte and the first titrant and for detecting a second titration endpoint of the reaction between the second analyte and the second titrant, wherein the detector is downstream form the first and second titrant inlets and a defined distance from the first and second titrant inlets; and
   a controller communicatively coupled to the sample pump, the first titrant pump, the second titrant pump, and the detector,
   wherein the conditioning manifold comprises a first liquid mixer and the conditioning manifold is downstream from the sample stream inlet, the first titrant inlet and the second titrant inlet are downstream from the conditioning manifold and upstream from the second liquid mixer, and the second liquid mixer is upstream from the detector,
   wherein the controller controls the sample pump to set a continuous flow rate of the sample stream, controls the first titrant pump to set a continuous flow rate of the first titrant, controls the second titrant pump to set a continuous flow rate of the second titrant, and receives data from the detector to detect the first titration endpoint for the reaction between the first analyte and the first titrant and determine the first analyte concentration at the first titration endpoint and to detect the second titration endpoint for the reaction between the second analyte and the second titrant and determine the second analyte concentration at the second titration endpoint.

2. The automated titration system of claim 1, wherein the multi-wavelength detector is capable of detecting signals in the ultraviolet to visible light range.

3. The automated titration system of claim 2, wherein the multi-wavelength detector is a spectrometer.

4. The automated titration system of claim 1, wherein the reaction manifold further comprises a 4-way valve at the first titrant inlet and the second titrant inlet that is downstream from the conditioning manifold and upstream from the second liquid mixer.

5. The automated titration system of claim 4, wherein the conditioning manifold further comprises a valve at a conditioning reagent inlet that is upstream from the first liquid mixer, and the first liquid mixer is upstream from the first titrant inlet and the second titrant inlet.

6. The automated titration system of claim 1, wherein the system further comprises a conditioning reagent source in fluid communication with a conditioning reagent pump and the conditioning manifold for pumping the conditioning reagent from the conditioning reagent source into the conditioning manifold to mix with the sample stream.

7. The automated titration system of claim 6, wherein the conditioning reagent source contains a pH buffer, a reaction catalyst, a chemical indicator, a sequestrant, a surfactant, a conductivity modifying salt, an ion pair reagent, a biologically based chemical, or a combination thereof.

8. The automated titration system of claim 7, wherein the conditioning reagent source contains potassium iodide, sulfuric acid, acetic acid, starch indicator, ammonium molybdate, or a combination thereof.

9. The automated titration system of claim 8, wherein the conditioning reagent pump further comprises a first conditioning reagent pump in fluid communication with a source of a first conditioning reagent and the conditioning manifold for pumping the first conditioning reagent and a source of a second conditioning reagent and a second conditioning reagent pump in fluid communication with the conditioning manifold for pumping the second conditioning reagent, wherein the first conditioning reagent is a metal iodide and the second conditioning reagent is an indicator.

10. The automated titration system of claim 6, wherein the controller is communicatively coupled to the conditioning reagent pump and configured to control the conditioning reagent pump to set a flow rate of the conditioning reagent injected into the sample stream.

11. The automated titration system of claim 1, wherein the first titrant inlet and the second titrant inlet are at the same point in the reaction manifold.

12. The automated titration system of claim 1, wherein the sample stream flows from the source of the sample through the sample pump, through the sample stream inlet into the reaction manifold, through the reaction manifold and into the detector.

* * * * *

UNITED STATES PATENT AND TRADEMARK OFFICE
CERTIFICATE OF CORRECTION

| | | |
|---|---|---|
| PATENT NO. | : 11,454,619 B2 | Page 1 of 1 |
| APPLICATION NO. | : 16/378714 | |
| DATED | : September 27, 2022 | |
| INVENTOR(S) | : Paul R. Kraus et al. | |

It is certified that error appears in the above-identified patent and that said Letters Patent is hereby corrected as shown below:

In the Claims

Column 16, Claim 1, Line 20: "form"
Should read -- from --

Signed and Sealed this
Twenty-fifth Day of April, 2023

Katherine Kelly Vidal
*Director of the United States Patent and Trademark Office*